United States Patent Office 3,290,305
Patented Dec. 6, 1966

3,290,305
CHLORO-s-TRIAZINYL-AMINOACIDS
Adolf Schmitz, Essen, Germany, assignor to
Th. Goldschmidt A.G., Essen, Germany
No Drawing. Filed Jan. 24, 1964, Ser. No. 339,852
Claims priority, application Germany, Feb. 5, 1963,
G 36,988
9 Claims. (Cl. 260—249.5)

This invention generally relates to novel heterocyclic organic compounds and is particularly directed to and has as one of its objects to provide a new group of triazine derivatives.

Considered from another aspect, the invention provides for disinfectants and alkaline disinfecting preparations containing as active ingredient the novel triazine derivatives and a method for disinfecting with such disinfectants and disinfecting preparations.

The novel triazine compounds of this invention are symmetrical triazine derivatives which, linked to carbon of the triazine ring, contain at least one chlorine atom, an aliphatic aminoacid having a free acid group and, optionally, an additional aliphatic or aromatic aminoacid group or amino, wherein one or several of the aminoacid groups and/or the amino are substituted by a higher molecular aliphatic substituent.

The inventive triazine derivatives, which may be prepared according to prior art processes, are represented by the following formula:

I

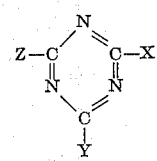

In this formula Z is chlorine, while X is an aliphatic aminoacid group having a free acid group. Y may be equal to X or may be an aminoacid group of different constitution than the aminoacid group of X. Y, however, may also be chlorine or amino of the kind previously indicated.

The preferred higher molecular aliphatic substituent is straight chain dodecyl. However, octyl, decyl or the alkyl groups of higher fatty acids are also suitable. In the following, a few examples of combinations for the symbols X, Y and Z are given.

| X | Y | Z |
|---|---|---|
| C₁₂H₂₅—N—CH₂COOH | Cl | Cl |
| C₁₂H₂₅—N—CH—CH₂COOH<br>　　　　　│<br>　　　　　CH₃ | Cl | Cl |
| C₁₂H₂₅.O.CH₂CH₂CH₂—N—CH.CH₂COOH<br>　　　　　　　　　　　│<br>　　　　　　　　　　　CH₃ | Cl | Cl |
| C₈H₁₇—N—CH₂CH₂COOH | Cl | Cl |
| C₁₀H₂₁—N—CH₂COOH | Cl | Cl |
| C₁₆H₃₃—N—CH₂CH₂COOH | Cl | Cl |
| C₁₈H₃₇.O.CH₂CH₂CH₂—N—CH₂COOH | Cl | Cl |
| CH₃(CH₂)₉CH.COOH<br>　　　　　│<br>　　　　　NH | Cl | Cl |
| CH₃(CH₂)₁₃—CH—COOH<br>　　　　　　│<br>　　　　　　NH | Cl | Cl |
| CH₃(CH₂)₁₅—CH—COOH<br>　　　　　　│<br>　　　　　　NH | Cl | Cl |
| C₁₂H₂₅—N—CH₂CH₂.SO₃H | Cl | Cl |
| C₁₂H₂₅—⟨SO₃H⟩<br>　　　　　NH | Cl | Cl |
| C₈H₁₇—N—⟨⟩—SO₃H | Cl | Cl |
| C₁₂H₂₅—N—⟨⟩—SO₃H | Cl | Cl |
| C₁₂H₂₅—N—CH₂COOH | NH₂— | Cl |
| —NH—CH₂COOH | C₁₂H₂₅NH— | Cl |

| X | Y | Z |
|---|---|---|
| −NH−⟨C₆H₄⟩−COOH | C₁₂H₂₅NH− | Cl |
| −NH−⟨C₆H₄⟩−SO₃H | C₁₂H₂₅NH− | Cl |
| C₁₂H₂₅−N(−CH₂COOH)− | C₁₂H₂₅−N(−CH₂COOH)− | Cl |
| C₁₂H₂₅−N(−CH₂COOH)− | CH₃(CH₂)₃NH− | Cl |
| C₁₂H₂₅−N(−CH₂CH₂COOH)− | ⟨C₆H₅⟩−NH− | Cl |
| C₁₂H₂₅−⟨C₆H₃(SO₃H)(NH)⟩− | HOC₂H₄NH− | Cl |
| −HN−⟨C₆H₄⟩−SO₃H | C₁₂H₂₅−⟨C₆H₃(SO₃H)(NH)⟩− | Cl |

A large number of compounds embraced by the general Formula I has been prepared. It will be realized that within the scope of the general Formula I there exists a great number of possibilities to vary the meaning of the symbols.

The compounds of the general Formula I given hereinabove exhibit superior disinfecting characteristics. This is particularly true if the compounds form the active ingredient of an aqueous alkaline disinfecting preparation.

Accordingly, it is a further object of this invention to provide a novel class of disinfectants and a novel kind of disinfecting preparation.

Another object of the invention is to provide for an improved disinfecting method.

An alkaline aqueous disinfecting preparation which contains as active ingredient an inventive triazine compound, has a disinfecting action and effect which is quite different and distinct from that of known preparations containing cationic or ampholytic surface active agents. Thus, without wanting to be limited to any theories advanced, it is believed that the inventive triazine compounds are capable of entering into a covalent irreversible chemical bond with cell components of the microorganism to be destroyed. Therefore, the inventive triazine derivatives are chemically reactive agents exhibiting an exceedingly broad action spectrum or range. This is demonstrated, for example, by the fact that the compounds react both with fungi and also with bacteria or viruses and impede such microorganisms in their growth or actually are capable of destroying them.

An alkaline aqueous preparation containing the inventive triazine compounds should for disinfecting purposes preferably have a pH value of not less than 10. Such aqueous alkaline solutions of the inventive triazine compounds are capable in relatively low concentrations and within short periods of time effectively to destroy microorganisms. It is believed that in the reaction between the triazine compound and the respective microorganism, the triazine compound is bonded to a suitable reactive chemical group of the microorganism, for example to hydroxyl or amino, by splitting off of HCl from the triazine compound. This assumption is strengthened by the following experiment:

*Experiment I.*—An aqueous sodium carbonate solution of 3% concentration was used to prepare three separate solutions of 0.1% concentration of (a) 4.6 - dichloro-s-triazine-2-dodecyl-$\beta$-amino-butyric acid;
(b) 6 - chloro-4-hydroxy-s-triazine-2-dodecyl-$\beta$-amino-butyric acid;
(c) 4.6-dihydroxy-s-triazine-2-dodecyl-$\beta$-aminobutyric acid.

1 ml. of a culture of *Staphylococcus aureus haemolyticus* (germ number: $10^8$–$10^9$ per ml.) was added to 10 ml. of each of the three solutions referred to. The culture had been grown for sixteen hours. After the time periods indicated in the following Table I, 0.1 ml. of these solutions was transferred to agar counting plates. The germ growth was determined after an incubation period of twenty-four hours. The experiment yielded the following results as tabulated in Table I.

TABLE I

| Compound | Germ number after action time in minutes | | | | | |
|---|---|---|---|---|---|---|
| | 1 | 5 | 10 | 20 | 30 | 60 |
| a | + | $4 \cdot 10^4$ | $1.5 \cdot 10^3$ | 0 | 0 | 0 |
| b | + | + | + | + | $9 \cdot 10^4$ | $3 \cdot 10^4$ |
| c | + | + | + | + | + | + |

+=not countable.

The alkaline aqueous solutions of the inventive compounds have a considerably reduced surface tension. Thus, the surface tension of the solutions of Experiment I is about 40 dyn. cm.$^{-1}$.

By introducing a higher molecular aliphatic substituent, such as dodecyl, into the molecule of a non-surface active known anionic s-triazine compound, as for example, 4.6-dichlorotriazine-2-aminobenzene sulfonic acid, such compound is imparted with surface active properties and, most surprisingly, the bactericidal action of such compounds is increased to a significant extent. This is demonstrated by the following experiment.

*Experiment II.*—This experiment was carried out with 0.0025 m. aqueous solutions of (d) 4.6-dichlorotriazine-2-sulfanilic acid;
(e) 4.6-dichlorotriazine-2-$\beta$-aminobutyric acid;
(f) 4.6-dichlorotriazine-2-dodecyl-sulfanilic acid;
(g) 4.6-dichlorotriazine-2-dodecyl-$\beta$-amino-butyric acid.

The aqueous solutions, in addition to the active ingredient of d, e, f, and g, respectively, contained 1% of sodium carbonate. 1 ml. of a *Staphylococcus aureus haemolyticus* culture which had been grown for sixteen hours and which had a germ number of $2\times10^8$ ml. was added to 10 mm. of each of the solutions d through g. With a view to determining quantitatively the degree of germ destruction, suitable amounts were withdrawn from the solutions after predetermined action periods and were applied to nutrients in the form of agar plates. The agar plates were thereafter incubated for twenty-four hours at 37° C. The surviving germs were counted.

The activity constant K was thereafter calculated from the figures obtained. This was done according to the method of Sykes Disinfection and Sterilization, London, E. & F. N. Spon Ltd., pages 15 and 16, corresponding to the formula $$\frac{1}{t_2-t_1} \log \frac{n_1}{n_2} = K$$

wherein $n_1$ and $n_2$ designate the germ numbers which have been obtained at the corresponding action periods $t_1$ and $t_2$, respectively (see Table II):

TABLE II

| Compound | Surface tension, dyn. cm.$^{-1}$ | K |
|---|---|---|
| d | 73 | 0.0016 |
| e | 73 | 0.003 |
| f | 49 | 0.03 |
| g | 41 | 0.15 |

The value calculated for K is approximately proportional with regard to the activity. The result of this experiment clearly demonstrates that the inventive compounds are about 25 to 50 times as effective than the analogous low molecular compounds. Reduction of the surface tension in the solutions d and e, which may be accomplished by addition of a customary wetting agent, does not increase the bactericidal effect of the solution. The superiority of the inventive compounds is thus caused by the fact that the moiety which causes the surface activity is built into the molecule of the triazine compound.

The superiority of the inventive compounds as compared with known compounds is best illustrated by germ carrier experiments which simulate actual conditions, as evidenced by the following experiment:

*Experiment III.*—This experiment was carried out with a number of metal cylinders of 10 mm. length, 5 mm. diameter and about 2.5 cm.$^2$ of surface area. The surfaces of the metal cylinders were rough. The metal cylinders were immersed for fifteen minutes into a culture, grown for sixteen hours, of *Staphylococcus aureus haemolyticus*, whereafter the cylinders were taken out from the culture and dried on the air.

The extent of infection was determined by placing some of the germ carriers directly after the drying into 5 ml. of a nutrient broth. The germs adhering to the cylinders were to a large extent removed therefrom by lightly shaking the cylinder in the broth for about one minute. A suitable amount of the nutrient broth was then transferred in the usual manner to counting plates. The number of surviving germs was determined after incubation.

A number of the infected germ carriers, i.e., the metal cylinders, was inserted into a 0.005 m. solution of 4.6-dichlorotriazine-2-sulfanilic acid which contained 1% of sodium carbonate (solution A). Other infected metal cylinders were immersed in a 0.005 m. solution of 4.6-dichlorotriazine-2-dodecyl-β-aminobutyric acid which also contained 1% of sodium carbonate (solution B). Some of the germ carriers were removed from the solutions after predetermined periods and were dried. Any germs which were still adhering to the cylinders were then removed in a nutrient broth as previously described. The number of these germs was determined in the usual manner. The result is tabulated in the following table in which the average values of at least five different determinations are indicated.

TABLE III

| Action period in minutes | 0 | 5 | 10 | 30 | 60 | 120 | 180 |
|---|---|---|---|---|---|---|---|
| Solution A: | | | | | | | |
| Germ number | 2.2·10$^5$ | 5.5·10$^4$ | 3.5·10$^4$ | 5.6·10$^3$ | 2.9·10$^2$ | 3·10$^1$ | 0.3·10$^1$ |
| Germ decrease, percent | 0 | 75.0 | 84.0 | 96.5 | 99.87 | 99.88 | 99.998 |
| Solution B: | | | | | | | |
| Germ number | 2.2·10$^5$ | 3.3·10$^3$ | 10$^3$ | 8.5·10$^1$ | 0 | 0 | 0 |
| Germ decrease, percent | 0 | 96.5 | 99.5 | 99.96 | 100 | 100 | 100 |

In viewing Table III, it will be noted that the inventive compound in solution B causes already after about ten minutes a reduction or decrease in the number of germs of more than 99%. By contrast, the known compound of solution A reaches this value only after an action period of one hour. The addition of a customary wetting agent to solution A does not result in any significant improvement of the germ killing effect of the solution.

Additional experiments have conclusively demonstrated that the bactericidal effect of the inventive substances is to a certain extent depend on the pH of the solutions. Thus it has been established that pH values below 10 are not advantageous. The germicidal action and effect can be increased or can be directed to predetermined microorganisms which cause certain diseases or putrefaction, by varying the organic substituent or substituents, particularly if the substituent is in an amino group. In this manner, disinfecting preparations can be produced which are particularly effective against viruses.

A particular advantage of the inventive disinfecting preparations resides in that they may be admixed with additional customary ingredients suitable for facilitating cleaning and cleansing of surfaces. Such additional ingredients may be inorganic agents and/or anionic substances having a washing effect. Since the inventive triazine compounds generally are substances in powder form, the inventive compounds may be marketed in solid form, for example, in the form of tablets which are admixed with scouring and cleansing agents of any suitable kind.

The inventive compounds are particularly suitable for the cleaning and disinfection of containers, such as bottles and cans, and devices and apparatus generally used in the food industry. Furthermore, the inventive substances and preparations are eminently suitable for the cleaning and disinfection of floors, walls, dishes, particularly of restaurant kitchens and the like and hospitals. Of course, the inventive preparations may generally be used for household purposes, i.e., to clean kitchenware and the like.

The invention will be described further in detail in the following examples which are given by way of illustration and not by way of limitation. It should be realized that many changes may be effected in process conditions in general without affecting in any way the scope and spirit of this invention as recited in the appended claims.

EXAMPLE I

Milk bottles were effectively disinfected by rinsing them for several minutes with an aqueous solution of a pH value of 11. The aqueous solution contained the following ingredients:

0.1% of 4.6-dichlorotriazine-2-dodecylglycine;
1% of sodium carbonate;
1% of a sodium phosphate mixture.

EXAMPLE II

This example deals with the disinfection of pipe lines which are used in food plants for conveying various food products such as juices, milk, soup and the like. The pipe lines were rinsed with an aqueous disinfecting solution of a pH of about 11. This solution contained about 1% of sodium carbonate-phosphate mixture and 0.1% of 4.6-dichlorotriazine-2-N-dodecyl-β-amino butyric acid. The disinfection was complete.

EXAMPLE III

Tiled floors of public baths, showers and restaurant kitchens were treated with an aqueous solution of a pH 11. This solution contained admixtures of inorganic cleaning agents and
0.05% of dodecylbenzene sulfoacid and
0.2% of 4-laurylamino-6-chloro-triazine-2-glycine.

EXAMPLE IV

A powderous preparation particularly suitable for the disinfection of milk cans has the following composition:
90% by weight of sodium carbonate-phosphate mixture and
10% by weight of 4-butylamino-6-chlorotriazine-2-dodecylglycine.

An aqueous 2% solution of this preparation had a pH value of about 11.

EXAMPLE V

The surfaces of workbenches, machines and equipment used in fish canning plants were efficiently cleaned and disinfected with aqueous solutions containing the following ingredients:
0.1% of 4.6-dichlorotriazine - 2 - dodecyl-aminobutyric acid;
0.1% of 4.6-dichlorotriazine-2-dodecyl-sulfanilic acid;
1% of sodium carbonate;
1% of phosphate mixture.

EXAMPLE VI

A pulverulent preparation particularly suitable for the cleaning and disinfection of slaughtering houses and butcher shops had the following composition:
6% of 4.6-dichlorotriazine-2-dodecyl-β - aminobutyric acid;
4% of 6-chlorotriazine-2.4-di(dodecyl-β-aminobutyric acid);
90% of sodium carbonate-phosphate mixture.

A 2% aqueous solution of this powder mixture has an alkaline pH and is suitable for the purpose indicated hereinabove.

EXAMPLE VII

*Preparation of 4.6-dichlorotriazine-2-N-dodecyl-aminobutyric acid*

A slurry of 185 grams (1 mole) of cyanuric-chloride in 250 cm.³ of acetone is added to 4 liters of ice water. A solution of 273 grams (1 mole) of N-dodecyl-aminobutyric acid

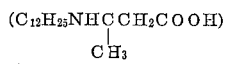

and 80 grams (2 moles) of sodium hydroxide in 2.5 liters of water is slowly dropped into the cyanuric chloride suspension within twenty minutes.

The reaction temperature should not exceed +5° C. After the addition of the sodium salt of the N-dodecyl-β-aminobutyric acid has been completed, the reaction mixture is stirred for an additional forty minutes at 0° C.

A clear solution is obtained which is acidified with 200 cm.³ of concentrated hydrochloric acid. A product precipitates which is filtered off, washed with water and dried at 50° C. in a vacuum drying oven. 4.6-dichlorotriazine-2-N-dodecyl-β-aminobutyric acid is obtained in the form of a white-yellowish powder.

EXAMPLE VIII

*Preparation of 4.6-dichlorotriazine-2-dodecyl-glycine*

This substance is produced in the same general manner disclosed in Example VII. The starting materials are as follows:
185 grams of cyanuric chloride (1 mole);
486 grams of a 50% aqueous dodecyl-glycine solution (1 mole) ($C_{12}H_{25}NHCH_2COOH$);
80 grams of caustic soda (2 moles).

EXAMPLE IX

*Preparation of 4.6-dichlorotriazine-2-dodecyl-sulfanilic acid*

The general preparation of this acid is effected in the same manner as disclosed in connection with Example VII. The starting materials are as follows:
185 grams of cyanuric chloride (1 mole);
341 grams of dodecyl-sulfanilic acid

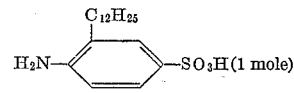

80 grams of sodium hydroxide (2 moles).

EXAMPLE X

*Preparation of 6-chloro-4-dodecylamino-triazine-2-glycine*

(a) 185 grams (1 mole) of cyanuric chloride in 250 cm.³ of acetone are added to 4 liters of ice water. A suspension is formed. A solution of 75 grams (1 mole) of glycocol ($H_2N-CH_2COOH$) and 80 grams of sodium hydroxide (2 moles) is added in dropwise manner and within twenty minutes to the suspension. Care is taken that the temperature does not exceed +5° C. The reaction is completed after an additional period of agitation of forty minutes. A clear yellowish solution is obtained.

(b) 184 grams (1 mole) of dodecyl amine ($C_{12}H_{25}NH_2$)

are added to the clear yellowish solution and the reaction is effected under agitation for 1 to 1.5 hours at 40° C. 6-chloro-4-dodecylamino-triazine-2-glycine is obtained. This substance is salted out by the addition of NaCl, is filtered off and dried in a vacuum drying oven at 50° C.

EXAMPLE XI

*Preparation of 6-chloro-4-butylamino-triazine-2-dodecyl-glycine*

The preparation is effected in substantially the same manner as disclosed in Example X.

(a) The starting materials and their quantities are as follows:
135 grams of cyanuric chloride (1 mole);
486 grams of a 50% aqueous dodecyl-glycine solution ($C_{12}H_{25}NHCH_2COOH$) (1 mole);
80 grams of sodium hydroxide (2 moles).
(b) 73 grams of butylamine 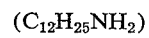$CH_3CH_2CH_2CH_2NH_2$) (1 mole).

EXAMPLE XII

*Preparation of 6-chlorotriazine-2,4-di (N-dodecyl-β-aminobutyric acid)*

The preparation of this compound is effected substantially in the same manner as disclosed in connection with Example X.

The starting materials and the quantities thereof are as follows:
(a) 185 grams of cyanuric chloride (1 mole);
273 grams of N-dodecyl-β-aminobutyric acid (1 mole)

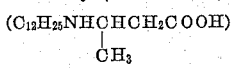

80 grams of caustic soda (2 moles).
(b) 273 grams of N-dodecyl-β-aminobutyric acid (1 mole).

EXAMPLE XIII

*Preparation of 6-chloro-4-hydroxyethylamino-triazine-2-dodecylsulfanilic acid*

The preparation of this compound is effected in the same manner as disclosed in Example X.

The starting materials and their quantities are as follows:
(a) 185 grams of cyanuric chloride (1 mole)
341 grams of dodecylsulfanilic acid

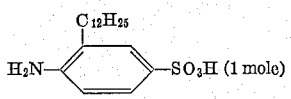

80 grams of caustic soda (2 moles).
(b) 61 grams of monoethanolamine $HOCH_2CH_2NH_2$ (1 mole).

Generally, the inventive triazine derivative may be prepared according to the method as disclosed in the Journal of the American Chemical Society, volume 73, page 2983 of 1951, in an article by Thursten.

The embodiments of the invention in which an exclusive property or privilege is claimed are defined as follows:

1. A compound of the formula

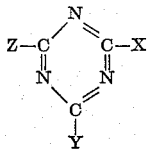

wherein Z is chlorine;
X is an alkyl amino acid group of not more than 20 carbon atoms or an aromatic amino acid group, wherein the aromatic group is phenyl;
Y is selected from the group consisting of chlorine, amino, amino acid groups as represented by X and amino acid groups different from the amino acid groups of X, at least one of said amino acid groups and amino being linked to a higher aliphatic substituent.

2. A compound as claimed in claim 1, wherein said higher aliphatic substituent is selected from the group consisting of straight chain dodecyl, octyl, decyl and the alkyl groups of higher fatty acids.

3. N(4,6 - dichloro - s - triazin - 2 - yl) - N - (dodecyl)-β-aminobutyric acid.

4. N(4,6 - dichloro - s - triazin - 2 - yl - dodecyl-glycine.

5. N(4,6 - dichloro - s - triazin - 2 - yl) - 5(3)-(dodecyl)-sulfanilic acid.

6. N(6 - chloro - 4 - dodecylamino - s - triazin - 2 - yl)-glycine.

7. N(6 - chloro - 4 - butylamino - s - triazin - 2 - yl)-dodecylglycine.

8. 2,4 - di - [N - (N - dodecyl - β - aminobutyroyl)]-6-chloro-s-triazine.

9. N[(6 - chloro) - 4 - (β - hydroxy ethylamino) - s-triazin-2-yl] sulfanilic acid.

References Cited by the Examiner

UNITED STATES PATENTS

| | | | |
|---|---|---|---|
| 3,092,545 | 6/1963 | Williamson | 167—33 |
| 3,110,710 | 11/1963 | Rattee et al. | 260—153 |
| 3,125,564 | 3/1964 | Heslop et al. | 260—153 |
| 3,136,690 | 6/1964 | Beriger | 167—33 |

WALTER A. MODANCE, *Primary Examiner.*

JULIAN S. LEVITT, *Examiner.*

G. A. MENTIS, J. M. FORD, *Assistant Examiners.*